Figure 1:
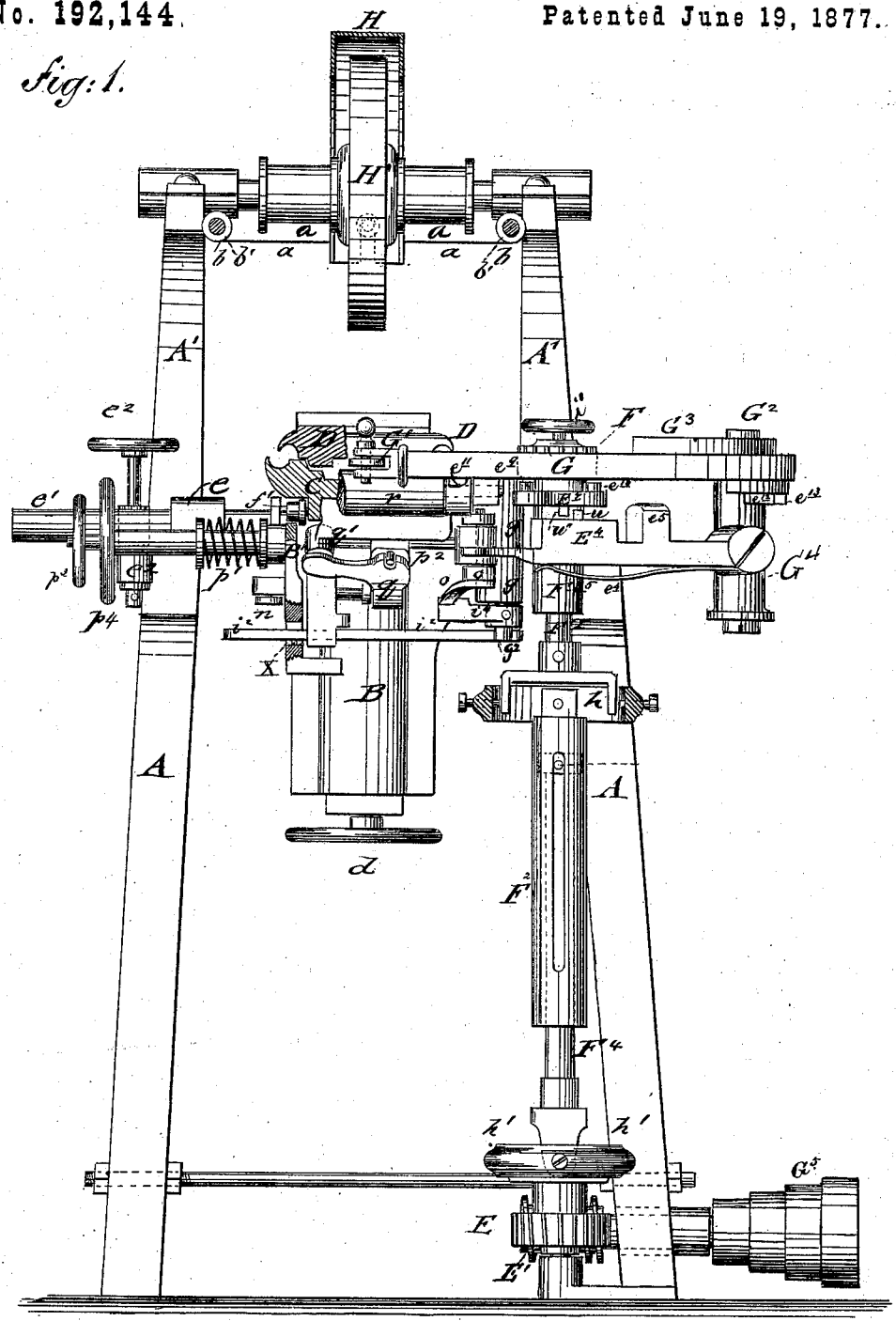

L. BOLLMANN.
GRINDING-MACHINE.

No. 192,144. Patented June 19, 1877.

WITNESSES:

INVENTOR:
L. Bollmann
BY
ATTORNEYS.

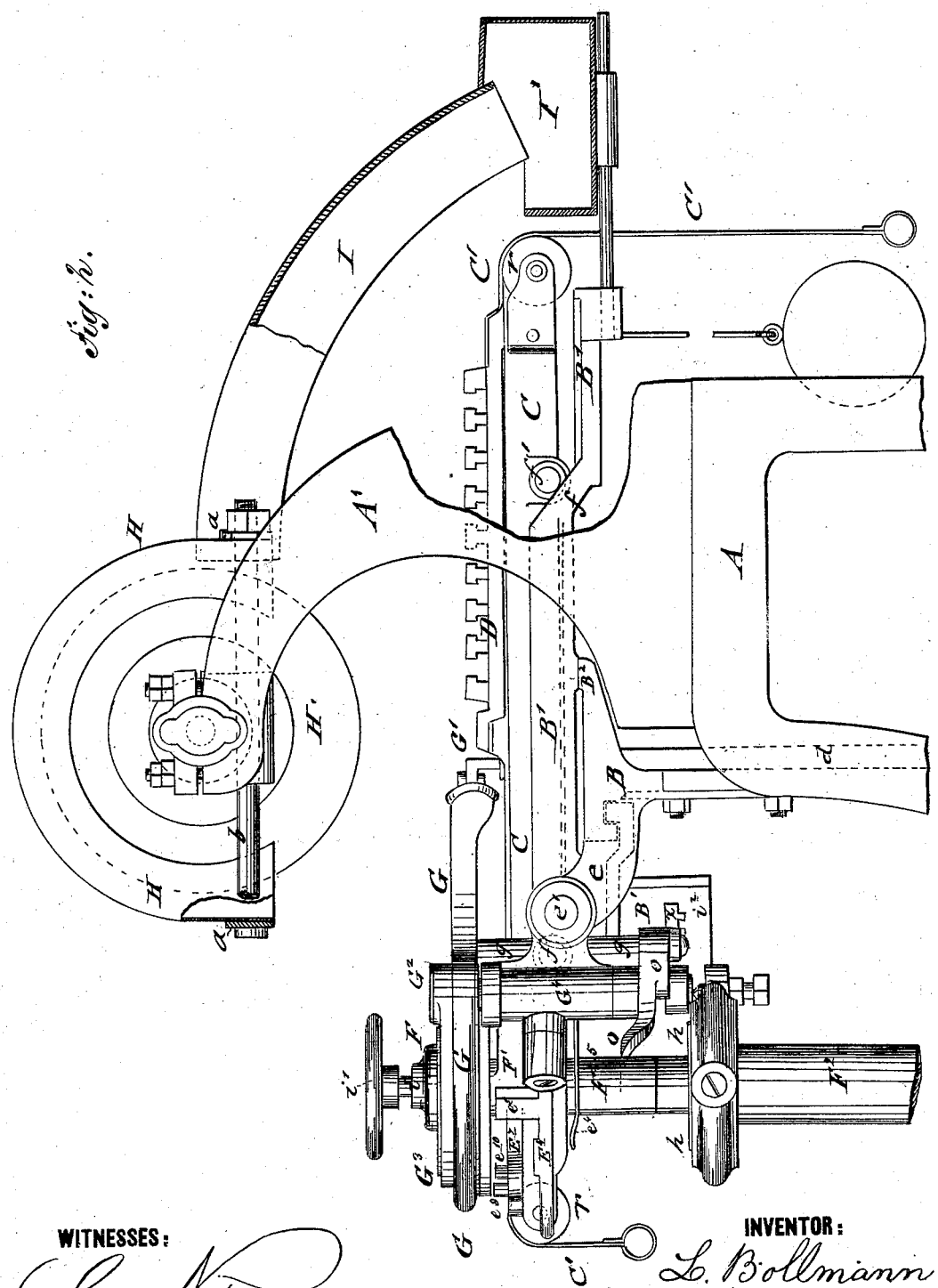

L. BOLLMANN.
GRINDING-MACHINE.
No. 192,144. Patented June 19, 1877.
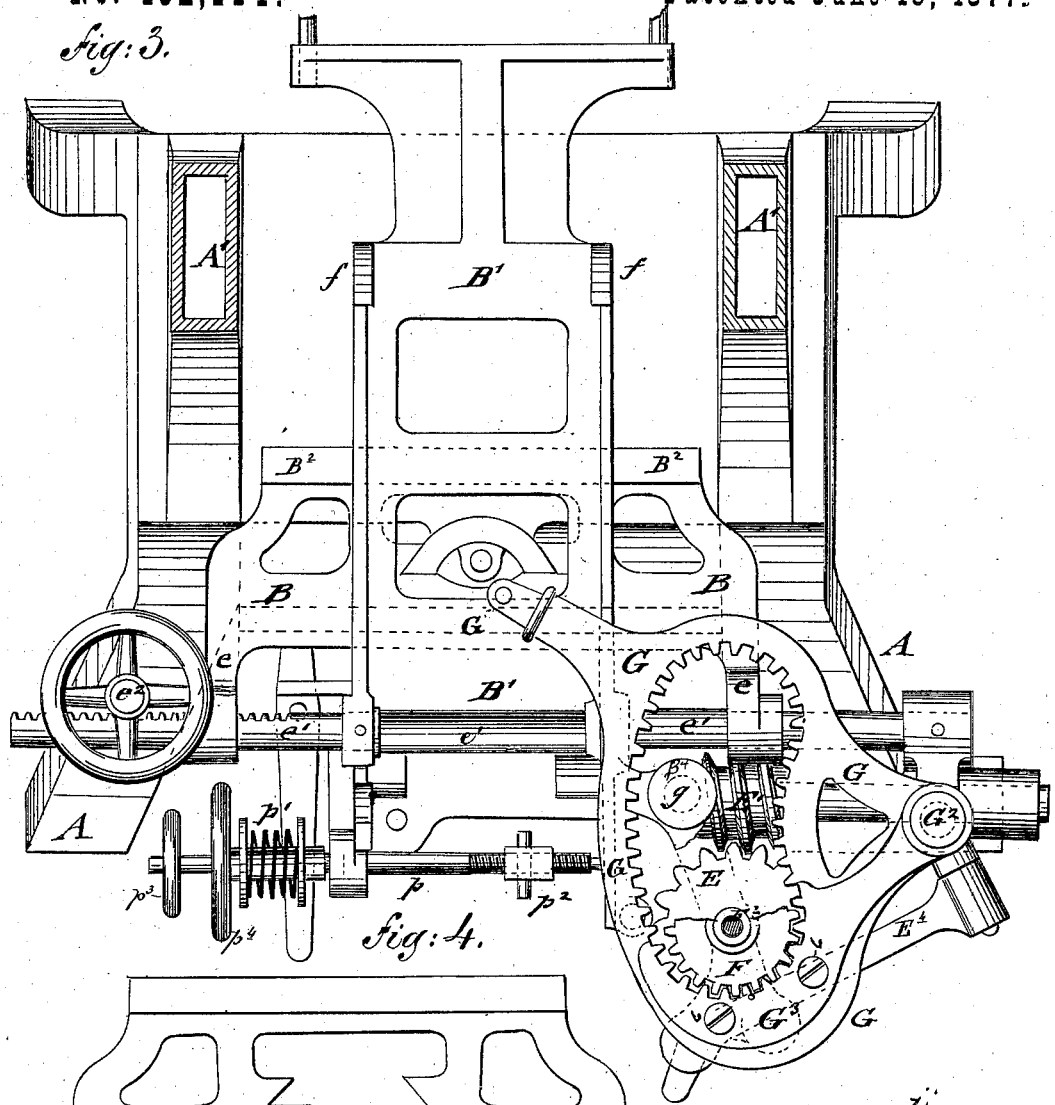
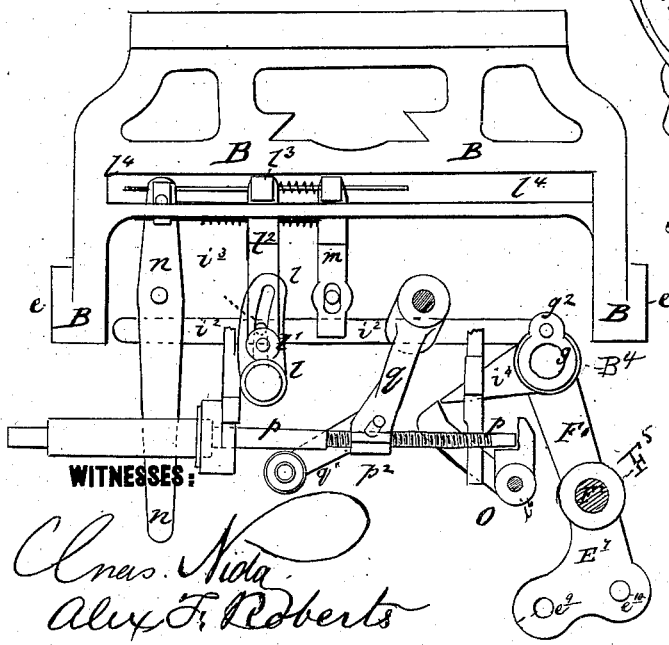
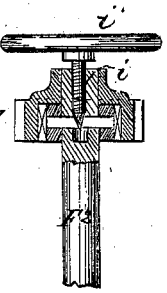

L. BOLLMANN.
GRINDING-MACHINE.
No. 192,144. Patented June 19, 1877.
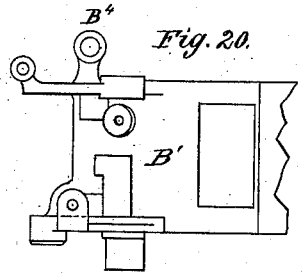
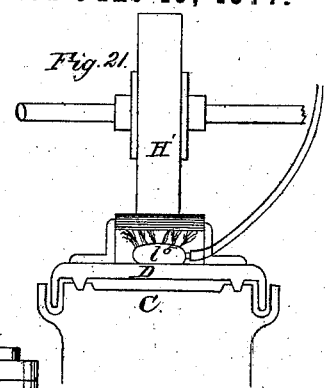
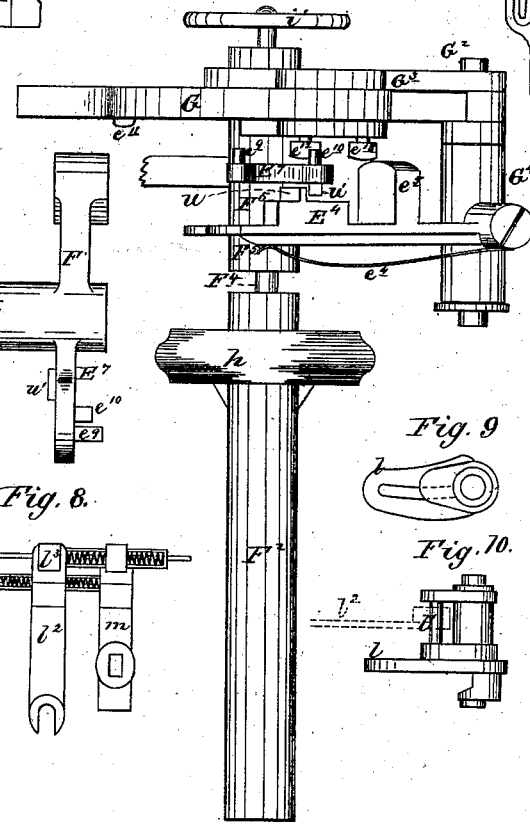
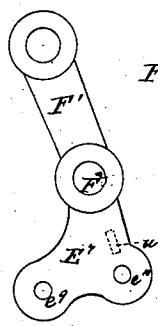
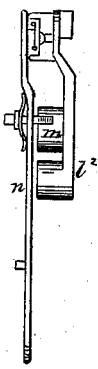
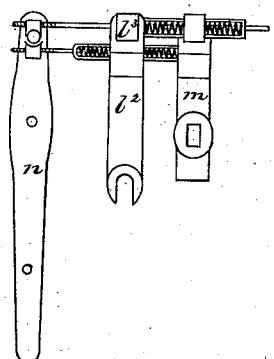
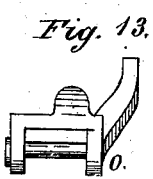
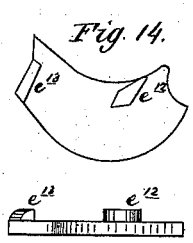
WITNESSES:
W. W. Hollingsworth
Olon C. Kemon
INVENTOR:
L. Bollmann
BY
ATTORNEYS.

5 Sheets—Sheet 5.
L. BOLLMANN.
GRINDING-MACHINE.
No. 192,144. Patented June 19, 1877.
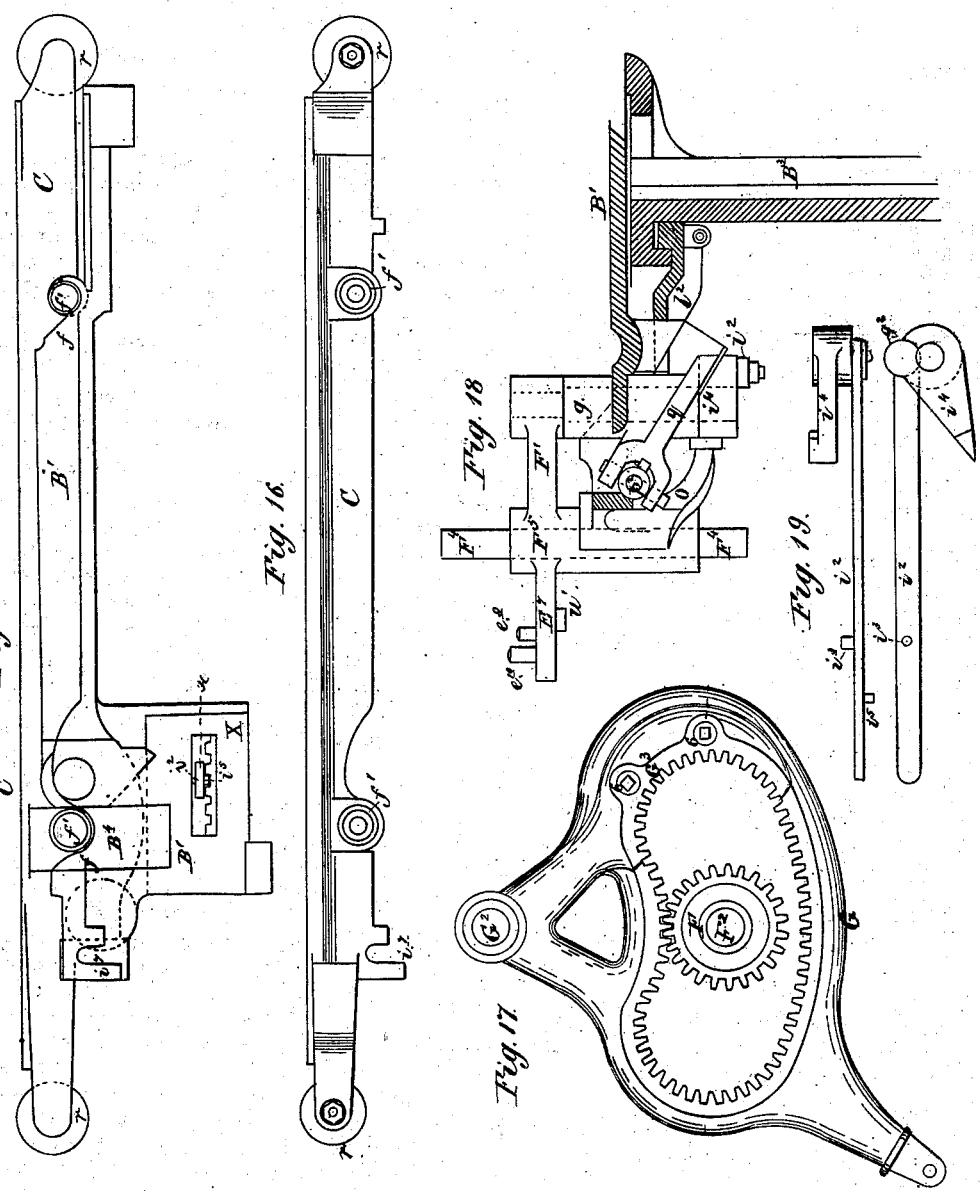
WITNESSES:
W. W. Hollingsworth
Colon C. Kemon
INVENTOR:
L. Bollmann
BY
ATTORNEYS.
N. PETERS, PHOTO-LITHOGRAPHER, WASHINGTON, D. C.

UNITED STATES PATENT OFFICE.

LOUIS BOLLMANN, OF VIENNA, AUSTRIA.

IMPROVEMENT IN GRINDING-MACHINES.

Specification forming part of Letters Patent No. 192,144, dated June 19, 1877; application filed September 1, 1876.

*To all whom it may concern:*

Be it known that I, LOUIS BOLLMANN, of Vienna, in the Empire of Austria, have invented a new and Improved Grinding-Machine, of which the following is a specification:

The invention relates to an improved machine for grinding any article, by means of emery-wheels, in a perfect manner, by feeding the work by an elastic yielding pressure to the emery-wheel, and controlling the grinding process, and preventing any danger from the bursting of the wheel.

The invention consists of an emery grinding-machine, with a reciprocating slide-rest that feeds the work with yielding pressure, and allows the grinding action of the emery-wheel during the forward motion only of the slide-rest. The slide-rest and its operating mechanism are laterally movable for adjustment in the main frame.

A hood mounted on an elastic support over the emery-wheel guards against danger from a bursting emery-wheel.

In the accompanying drawing, Figure 1 is a front view (partly in section) of the entire machine, the upper part of the slide-rest being removed. Fig. 2 is a side view of the machine. Fig. 3 is a top view of the same, the upper slide-rest being removed, and also the emery-wheel, the arms for supporting the latter being shown in section. Fig. 4 is a plan view of the mechanism for changing the position of the slide-rest. Fig. 5 is a detail sectional view of the clutch, attached to the principal gear which operates the sliding table upon which the work is placed. Fig. 6 is a detail view, in side elevation, of the chief mechanism for operating the sliding table.

The other figures represent details of this machine, to which I will refer in the following description:

The machine rests on the under frame A, which is fastened to the main body $A^1$, having two arms projecting upward for the bearings, in which the spindle of the emery-wheel freely revolves. Holes are formed in the arms $A^1$ to receive the long bolts $b$ on both ends, to which are fastened the two spring steel bars $a\ a$ that carry the protecting hood H, so that the latter can be adjusted to suit the size and position of the emery-wheel $H^1$.

This arrangement of the bolts $b$, the bars $a$, and the hood H is in its nature such that the hood is adapted to yield, so that in case the emery-wheel bursts the great shock will not break the arms $A^1$ of the main frame, but its force will be effectually taken up by the spring-bars $a$ without doing any harm. Practice has shown that such elastic spring-connection of the hood is the surest way to prevent accidents to the workmen, and breakage of the machinery. Of course the form of the spring-bar and the connection must be varied according to the circumstances, or to the form under which the emery-wheel is used.

To the lower part of the main frame $A^1$ is connected the vertical slide B, which carries the slide-rest with its mechanism, so that it can be raised or lowered by means of a set-screw, to which is fastened a hand-wheel, $d$, Fig. 1, for the purpose of accommodating the height of the bed to which the work is fastened to the size of the emery-wheel, or to the thickness of the tool to be ground. This vertical slide B has two arms with bearings $e\ e$, in which slides freely the long shaft $e^1$, to which the bed $B^1$ is fastened. This shaft $e^1$ is provided with teeth on its end, into which gears a pinion, having a hand-wheel, $e^2$, Fig. 3, so that by turning this hand-wheel the shaft $e^1$, and with it the bed $B^1$, and the upper slide-rest can be moved to the right or left in order to feed the work sideways under the emery-wheel.

The front side of bed $B^1$ rests on the sliding shaft $e^1$, as above explained, and the other side on a plane surface, $B^2$, extending backward, and forming part of the vertical slide B. On the bed $B^1$ (top view in Fig. 3, inside view in Fig. 14) are four short oblique bearing surfaces $f$, on which rest the friction-rolls $f^1$, which are fastened on two small shafts that support the horizontal slide-rest C. The slide-rest C forms, therefore, a wagon with four wheels resting on the four oblique surfaces $f$. Now, when this slide-rest C is moved forward it will rise on the inclines $f$, and contrarywise when it is moved backward; it will be lowered, while at the same time it will be kept perfectly horizontal.

The sliding table D, on which the work to be ground is fastened in any suitable manner, rests on the slide-rest C, and receives its backward and forward motion by the toothed segment-lever G, to which it is connected by the rod $G^1$ fastened at one end to the under side of the table, and at the other end to the extreme end of the lever G, Fig. 2. The toothed segmental-lever G receives its motion by a toothed wheel, F, having a bearing in the eye $F^5$ of the movable arm $F^1$, Figs. 2 and 15, having its fulcrum at $g$ on the bed $B^1$. This wheel F has thus so much side play that its center will change its position, so as to keep the teeth in continuous gear with the teeth of the segment G, the change taking place on the end of each back or forward motion of the segment-lever.

When the wheel F is in gear, or mesh with the longer side of segment G, the table is fed forward, and when in gear with the shorter side of said segment the table is fed backward. Owing to the difference between the distances of these toothed sides of the segment from fulcrum $G^2$, the backward movement is twice as fast as the forward movement.

The toothed part of the segment is made in two parts, in order to be able to change the length of the motions by lengthening or shortening the inside toothed space. The separate toothed arm $G^3$ can be turned on the center $G^2$, and fastened in any position to the arm G by means of the screws, Fig. 3. The shaft $G^2$ of the segment G has its bearing in an arm, $G^4$, fastened to the sliding shaft $e^1$, Figs. 2 and 3. The shaft of the wheel F carries on its under end one part of the universal joint $h$. A ring with four bearing-screws connects this with the under part of the joint, which is cast on a long, hollow, and slotted shaft, $F^2$, in which slides up and down freely a solid shaft, $F^4$, a key so connecting both shafts together that they must turn together, forming one shaft that can be lengthened or shortened, so as to accommodate itself to the changable position in height of the slide-rest. On the under end of shaft $F^4$ is another universal joint, $h^1$, which connects it to the screw-wheel E that rests in a step fastened into the under part of the frame A, and receives a continuous motion from a worm, $E^1$, on a horizontal shaft which is driven from the countershafting by a belt passing on the pulley $G^5$, Fig. 1.

This now-explained combination gives to the wheel F a continuous rotating motion. The means for keeping the wheel F in mesh with the segment G consists of a locking-bar, $E^4$, pivoted to a stud on the bearing $G^4$ of the toothed segment G, and supported in horizontal position by a plate-spring, $e^4$. Said bar $E^4$ has a lug or projection, $u$, near its outer end, and a raised portion, $e^5$, near its inner end. The lug $u$ engages a corresponding lug, $u'$, on the under side of the arm $E^7$, which is pivoted on sleeve on bearing $G^4$. This arm also has lugs $e^9$ $e^{10}$ on the upper side. Guide-flanges or lugs $e^{11}$ $e^{12}$ are attached to the under side of the segment G, and a cam projection is provided at $e^{13}$.

The operation is as follows:

As shown in Fig. 1, the lug $u$ of bar $E^4$ is engaged with the lug $u'$ on the under side of arm $E^7$, and the wheel F is thereby held in mesh with the right-hand side of the segment G, while the work is being fed from the emery-wheel. This action of bar $E^7$ is supplemented by the guide-lug $e^{11}$, with the outer side of which the lug $e^9$ on the arm $E^7$ works in contact.

When the wheel F approaches the front end of the segment G it is held in mesh partly by the guide-lug $e^{12}$, which works against the lug $e^{10}$ of arm $E^7$, and the locking-bar $E^7$ must also be changed from the position shown in Fig. 1 to that shown in Fig. 6, so that its locking-lug will pass to the opposite side of the lug on arm $E^7$, and thus hold the wheel in mesh with the opposite or shorter side of the segment G. This is effected by the cam $e^{13}$, which strikes the projection $e^5$ of bar $E^4$, thus forcing the latter down against the tension of spring $e^4$, when the continued rotation of wheel F carries it around to the position which allows the locking-lug $u$ to lock with lug $u'$ of arm $E^7$, as shown in Fig. 6, which position is maintained until the wheel reaches the rear end of the segment and the table has been fed back.

It is necessary that the bed-table D can be instantly stopped or set in motion; the wheel F is therefore connected to its shaft by a friction-clutch, as shown in Fig. 5 in section. A pointed screw, $i$, having a hand-wheel, $i^1$, is screwed through the center of the shaft, and presses with its conical point against two headed bolts, which act against the hollow part of the wheel when the screw is tightened, producing so much friction as required to carry the wheel with it. When the screw is loosened the shaft will revolve without the wheel. The slide-rest C has also a movement to the right or left, which can be increased or diminished, or stopped entirely, and also changed in its direction from right to left, or from left to right. The parts of this mechanism are below the table, and can therefore not well be seen in the main figures. Their mutual position is shown in the diagrams, Figs. 4 and 18, the first being a top view, and the latter a partly-sectional side view.

B is the vertical slide. $F^1$ is the movable arm, which carries in the eye $F^5$ the shaft $F^2$ of the wheel F, and is itself fastened on a shaft, socketed in an eye, $B^4$, of the bed $B^1$, Figs. 15ª and 20. On the under end of this shaft is fastened the arm $i^4$. Now, by the action of the wheel F with the segmental arm G, the arm $F^1$ will receive a short reciprocating motion at each stroke of the arm G, which motion is imparted to the under part or arm $i^4$. This part has a crank-pin, $g^2$, on which turns the long bar $i^2$, that is toward the left supplied with a pin, $i^3$, Figs. 15ª and 19, which works in a curved slot of the lever $l$, Figs. 9, 10, and 11, thus imparting its motion to that lever. The left end of this bar $i^2$ passes through a slot, $x$, Fig. 15$^a$, in the bed B$^1$, in which its position can be adjusted by means of a pin, $i^5$, entering the notches formed on the bed of the slot, so that the pin $i^3$ will gear in the slot of $l$ near or farther from the axis of the latter. When this pin gears near to the axis the motion of the lever $l$ will be greater. To the lever $l$ is jointed, on its crank-pin $l^1$, Fig. 4, the friction-pallet $l^2$, which has on its farthest free end a square projection, that fits loosely in a long slot, $l^4$, (see Figs. 4 and 18,) on the under surface of the vertical slide B. $m$ is a second similar pallet, that is jointed by a pin to the under side of the bed B, and also gears into the slot $l^4$. Fig. 4 shows that both these pallets are connected to the lever $n$, jointed to the bed B$^1$ by means of two rods and four spiral springs.

Now, when the lever $n$ is moved by hand to the right or left, the springs will pull both pallets with an elastic pressure in the same direction, whereby their projection will catch or jam themselves into the slot $l^4$ in one direction, while it will move quite freely in the other direction. It is the same principle as is applied by the cloth-feeding wheel of the Howe sewing-machine, except that in this case the pressure is in a straight line or direction. The other end of the pallet $l^2$ being moved by the lever $n$ in one direction, the square projection will slide, by the force of the spring, along in the slot; but when the lever moves in the contrary direction, the pallet cannot slide in the slot, but will act as a fulcrum, thereby moving the whole slide-rest. The second pallet $m$ is only to prevent the slide-rest moving backward. Accordingly as the lever $n$ is set to the left or to the right, the feed of the slide-rest will also be in the same direction, and when it is set in the middle, as shown in Fig. 8, the pallets will not be pressed in any direction, and then there will be no motion given to the slide-rest.

It is necessary the table with the work shall be slightly lowered when the work is going backward, in the direction of the motion of the acting-surface of the emery-wheel, while it is raised to bring the work in contact with the emery-wheel when moving forward. At the same time the pressure of the work against the emery-wheel must be a yielding or elastic one, which can be regulated at will, according to the condition of the work. This is accomplished in this machine in the following manner: The part or arm $i^4$ acts against the lever O, (see Figs. 12, 13, 4, and 18,) which turns on an eye, $i^6$, Figs. 18 and 20, on the bed B$^1$, so as to impart a small motion to it at the moment when the wheel F is changing its position. Against a tooth of this lever rests the end of the screw-spindle $p$, which works in two bearings in the bed B$^1$, and is pressed against the tooth of O by a strong spiral spring, $p^1$, Fig. 3. On the screw of this spindle is a nut, $p^2$, to which the lever $q$ is connected. The lever is arranged in an oblique position, and pivoted by a stud, on which it turns, to the under side of the bed B$^1$. This arm $q$ has an extension, $q^1$, which carries a friction-roll, that bears against the inner edge of the projection $i^7$, forming part of the slide-rest C. (See Fig. 16.)

Now, when the tooth of O is striking against the end of spindle $p$, pushing it toward the left, the nut $p^2$ will impart this motion to the lever $q$ and its projection $q^1$, thereby allowing the bed B$^1$ to sink slightly downward on the four inclined surfaces $f^1$, whereby the slide-rest will be lowered, so that the emery-wheel cannot touch the work. When the lever O is set free from the tooth then the spring $p^1$ will force the spindle to the right, and with it the lever $q$ and its friction-roller $q^1$, which will push the slide-rest C forward, and thus raise it upward on the four inclines $f$, as described. The slide-rest is thus held upward by the tension of the spring $p^1$, so that when a greater pressure pushes the slide-rest downward, as the tension allows, the table must yield. This tension of the spring $p^1$ can be regulated by the small hand-screw $p^3$. The spindle $p$ can be turned by the hand-wheel $p^4$, whereby the position of the nut $p^2$ and the lever $q$ $q^1$ will be altered, and the slide-rest set higher or lower, so as to adjust the height of the work very exactly, while the range of the small upward and downward motion at each stroke will remain the same.

On the front and back ends of the slide-rest C, Figs. 2, 15$^a$, and 16, are two rollers, $r$, over which pass two pieces of leather or cloth, fastened to the upper table D, and having weights attached to keep them stretched. They serve to protect the mechanism below and the slides from the dust made by the emery-wheel.

To lead away this dust, and also the metal ground away, there is a screen of sheet metal, I, placed behind the emery-wheel, (see Fig. 2,) of such shape and position as to catch the stream of filings and dust, and lead it directly into the tray I$^1$, which is filled with water.

To prevent certain kinds of work from getting unduly heated by the action of the emery-wheel, I use the following arrangement, (shown in action in Fig. 21:) C is the slide-rest, on which slides the table D on which the work to be ground by the emery-wheel H$^1$ is fastened, in such a manner that a free space is left between the table and the under side of the work. In this space is placed a hollow vessel or tube, $l^5$, connected to an elastic rubber tube, passing downward from a large reservoir of water placed on an elevated position. The vessel is perforated with very fine holes, through which squirt fine streams of water against the under surface of the work, whereby the latter is kept cool while being ground. The waste-water is led off the sides of the table into long channels, formed on the sides of the slide-rest C, from where it is led off by tubes below the machine.

Having thus described my invention, I claim as new and desire to secure by Letters Patent—

1. In a grinding-machine, the combination of the supports of the emery-wheel with a projecting hood, applied to elastic spring-bars or springs to take up the shock of a bursting wheel, substantially as described.

2. The combination of the slide-rest C, having friction-rollers, with the bed $B^1$, having inclines, whereby the table is adapted to be raised and lowered, as shown and described.

3. The combination of the toothed segment-lever G with the continuously-revolving gear-wheel F and the adjustable toothed section $G^3$, to lengthen or shorten the stroke of the slide-table, substantially as specified.

4. The combination of the gear-wheel F with the universal joint and double transmitting-shaft to follow the up-and-down motion of slide-rest, substantially as described.

5. The combination of the slide-rest with the friction-pallets and lever mechanism, arranged to operate in both directions to produce automatic side motion of slide-rest, as herein described.

6. The combination of the slide-rest C, having end rollers with weighted covering-aprons to protect the mechanism below against dust, substantially as set forth.

7. The combination, in a grinding-machine, of a vertically-sliding support, B, a swinging bed, $B^1$, seated thereon, and rising-and-falling slide-rest, and a reciprocating slide-table for the work, substantially in the manner and for the purpose set forth.

LOUIS BOLLMANN.

Witnesses:
  WILLIAM HINING,
  FERDINAND FICK.